G. F. ROSE.
BETWEEN THE LENS PHOTOGRAPHIC SHUTTER.
APPLICATION FILED JAN. 2, 1920.
1,377,366.
Patented May 10, 1921.
2 SHEETS—SHEET 1.
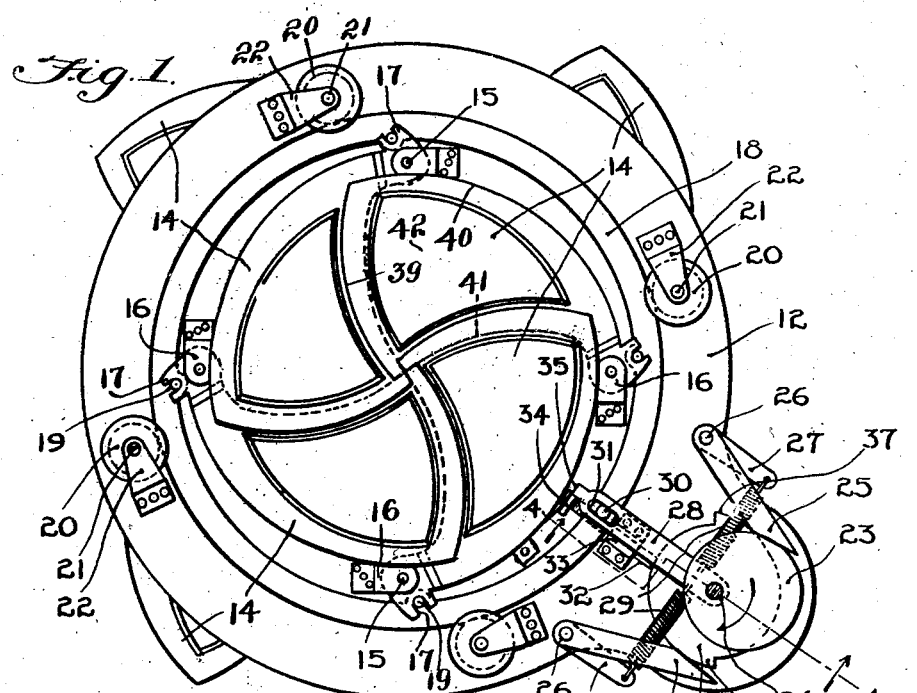
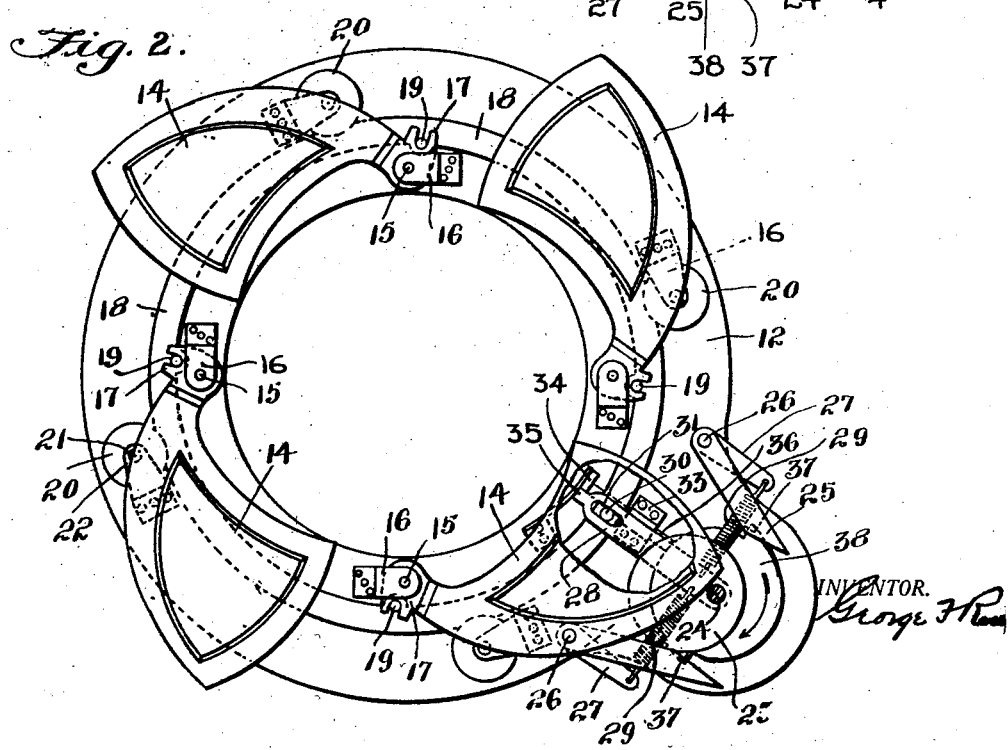

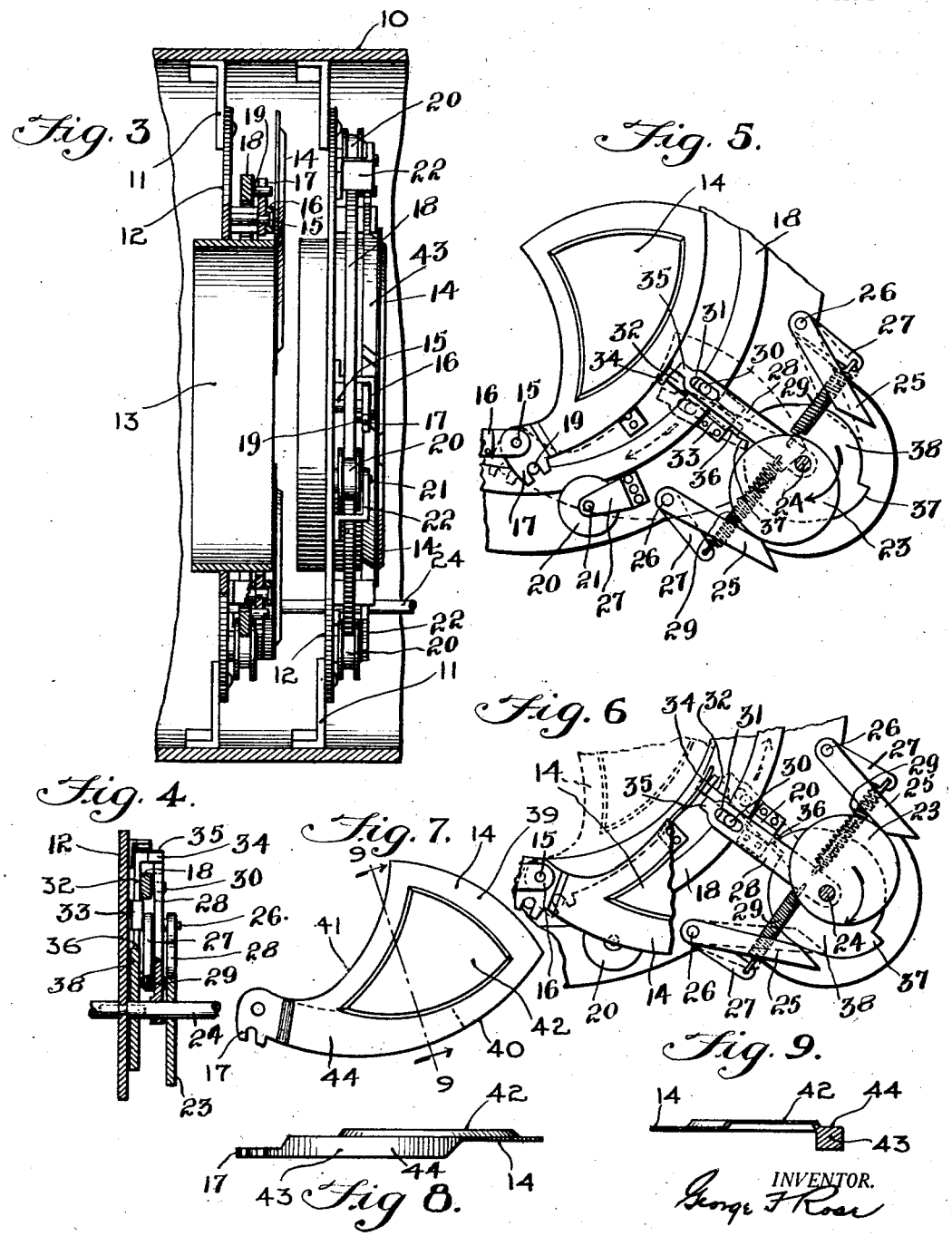

UNITED STATES PATENT OFFICE.

GEORGE F. ROSE, OF HYNDSVILLE, NEW YORK.

BETWEEN-THE-LENS PHOTOGRAPHIC SHUTTER.

1,377,366.   Specification of Letters Patent.   Patented May 10, 1921.

Application filed January 2, 1920. Serial No. 348,967.

*To all whom it may concern:*

Be it known that I, GEORGE F. ROSE, a citizen of the United States, residing at Hyndsville, in the county of Schoharie and State of New York, have invented certain new and useful Improvements in Between-the-Lens Photographic Shutters, of which the following is a specification.

The present invention relates to photographic shutters of the between-the-lens type and consists in the combinations and arrangements of elements hereinafter described and particularly set forth in the accompanying claims.

The purpose of the invention is to provide a camera shutter of pivotally mounted sections or leaves having means for accurately measuring the time for exposure of the film or plate, and wherein the shutter sections are of such design and so mounted as to admit light to enter through an ever enlarging opening and thereby obtaining substantially uniform exposure.

Another object of the invention resides in having two sets of independent shutter sections disposed to either side of the focal opening and alternately coöperable and regulable to open and close said opening for obtaining accurate timing of the exposure without the use of frictional springs or trains of gears heretofore employed for this purpose.

The device is designed with especial reference to the types of cameras used on aeroplanes wherein the large shutters are impractical for making a complete cycle, either reciprocal or of revolution, within the time allotted for a quick exposure.

The invention is disclosed by way of illustration in the accompanying drawings, wherein:—

Figure 1 is a view in front elevation of the shutter,

Fig. 2 is a view in rear elevation thereof with the leaves or sections in open position.

Fig. 3, a side elevational view, partly in section, showing both shutters.

Fig. 4, a sectional view taken on the line 4—4 of Fig. 1.

Fig. 5, a top plan view of the operating device, with the parts in one position.

Fig. 6, a similar view thereof with the parts in another position.

Fig. 7 shows one of the shutter leaves.

Fig. 8, an edge view thereof, and

Fig. 9 a sectional view of the leaf on the line 9—9 of Fig. 7.

Referring to the construction in further detail, wherein like reference characters designate corresponding parts in the different views shown, 10 represents the casing or that portion of the camera on which the shutters are usually mounted, and which mounting in this instance consists of suitable brackets 11 properly spaced and having secured thereto the flange portions 12 of the pair of rings 13 that are spaced after the manner shown in Fig. 3; and each of which rings is provided with the complete shutter and the actuating means therefor.

The shutter *per se* consists of a plurality of overlapping sections or leaves 14 of the design shown and each of which is pivotally mounted on a pintle 15 that is secured to the flange 12 of ring 13 by a bracket 16. Each of the leaves 14 is constructed with an offset and notched portion 17 adapted to be actuated by a master ring 18 having pins 19 engaging said notches whereby to actuate the several leaves in unison, as will be understood.

The master ring 18 for each shutter is mounted for rotation in a series of grooved rollers 20 that are journaled on pins 21, and each of which pins is in turn mounted on the flange 12 by a bracket 22. It will therefore be seen that a slight rotary movement given the master ring will impart a like movement to the several leaves of the shutter, and that, due to the lever or fulcrum arrangement employed, said leaves will be opened or closed in a simple and easy manner.

It will be understood that the two shutters operate in alternation and independently of each .other whereby through the opening of one shutter and, after a predetermined period the closing of the other shutter, an accurate timing of exposure is obtained and this without the use of frictional springs or trains of gears heretofore employed. In this respect the invention is especially adapted for use on cameras carried by aeroplanes, since the shutters on that type of camera now used are made up of leaves so large that it is highly impractical for them to make a complete cycle, either reciprocal or of revolution, within the time allotted for a quick exposure. It is to overcome this defect that the present arrangement of two sets of leaves is employed.

The means for actuating each master ring consists of a cam 23, or eccentric disk, mounted on the shaft 24 and which is adapted to alternately contact with the two arms 25 that are pivotally mounted at 26 on the flange portion 12 as shown. Each arm 25 serves to move a shorter arm or lever 27 that in turn connects with the lever 28 by the pair of springs 29 that connect with said lever 28 adjacent its fulcrum 24, and when tensioned to one side or the other operate to shift the master ring 18 through the pin and slot connection 30 and 31 on said ring and lever respectively.

Each shutter operating means is provided with a stop device consisting of a member 32 slidably mounted in a bearing part 33 and having an angular projection 34 at one end adapted to engage with opposite sides of the free end 35 of the lever 28 as shown. The inner end 36 of the slidable piece 32 is engaged and adapted to be actuated by the respective cam elements 37 formed on the disk 38 which is mounted on and turns with the shaft 24. In operation said stop device is released from position on one side of the lever 28 when the shutter leaves are closed, as in Figure 1, and move, through cam 37, to the other side thereof where it holds the shutter leaves in open position, as in Fig. 2.

Thus it will be clearly seen from the foregoing that through the operation of the shaft 24 the several leaves forming one of the shutters will be moved to open position, and at the proper interval for an exposure of the film or plate the continued movement of said shaft 24 will close the several leaves of the second shutter, and vice versa. The adjustment of the cams in one unit in relation to the cams in the other unit obviously determines the time of the exposure.

Each shutter leaf 14 per se is of substantially the design shown in Fig. 7, having the three arcuate edges 39, 40 and 41 disposed in relatively eccentric relation and each eccentric to the fulcrum point of the leaf itself. With this eccentric arrangement the shutter leaves drop away from the center when opening, thus admitting light to enter in an ever enlarging star-shaped opening rather than a purely revolving motion of the leaves, characteristic of the usual shutters of this type which permits light to penetrate the central portion of the opening for a much longer time than it does the outer portions thereof and consequently reducing the efficiency of the shutter and causing the outer edges of the exposed sensitive plate to receive less light than the central portion.

Each of the shutter leaves 14 has a raised or embossed portion 42 for giving the necessary rigidity to the structure, and in their assembled relation the several leaves are adapted to overlap, as shown in Fig. 1, and to this end each leaf has a heavy portion 43 providing a ledge 44 as shown.

It is obvious that those skilled in the art may vary the details of construction and arrangement of parts without departing from the spirit of my invention, and therefore I do not wish to be limited to such features except as may be required by the claims.

What I claim as new is:

1. In a camera shutter, the combination of a support having a focal opening, shutter leaves pivotally mounted on said support to either side of said opening and alternately coöperable to open and close the focal opening, master rings operatively connected with said shutter leaves, levers connected to said master rings respectively, and cam actuated means for operating said levers, substantially as set forth.

2. In a camera shutter, the combination of a support having a focal opening, shutter leaves pivotally mounted on said support to either side of said opening and alternately coöperable to open and close the focal opening, master rings operatively connected with said shutter leaves, a lever operatively connected to each of said master rings, and a pair of cam actuated arms for operating each of said levers, substantially as set forth.

3. In a camera shutter, the combination of a support having a focal opening, quadrant shutter leaves pivotally mounted on said support to either side of said opening and alternately coöperable to open and close the focal opening, a master ring associated with each set of shutter leaves, a lever operatively connected to each of said master rings, spring tensioned arms connected to actuate each of said levers, and cams for operating said tensioned arms, substantially as set forth.

4. In a camera shutter, the combination of a support having a focal opening, shutter leaves pivotally mounted on said support to either side of said opening and alternately coöperable to open and close the focal opening, a master ring operatively connected with each set of shutter leaves, a lever operatively connected to each of said master rings, a pair of pivotally mounted arms associated with each of said levers, resilient connections between each pair of arms and its respective lever, and a double cam element for operating each pair of said lever actuating arms, substantially as set forth.

5. In a camera shutter, the combination of a support having a focal opening, shutter leaves pivotally mounted on said support to either side of said opening and alternately coöperable to open and close the focal opening, a revoluble master ring operatively connected with each of said shutter leaves, a pivotally mounted lever operatively connected with each of said master rings, a pair of pivotally mounted arms for each set of shutter leaves, springs connecting each pair of said arms with said levers respectively, a double cam element associated with each of said arms, and a cam actuated stop associated with each of said levers, substantially as set forth.

In testimony whereof I affix my signature.

GEORGE F. ROSE.